(12) United States Patent
Brown et al.

(10) Patent No.: US 10,754,600 B1
(45) Date of Patent: Aug. 25, 2020

(54) SELF-NAVIGATING MOBILE PRINTERS MAKING AUTONOMOUS PRINTING DECISIONS

(71) Applicant: Xerox Corporation, Norwalk, CT (US)

(72) Inventors: Donald A. Brown, Honeoye Falls, NY (US); David M. Parsons, Victor, NY (US); Michael J. Telek, Pittsford, NY (US); Marc J. Krolczyk, Spencerport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/432,971

(22) Filed: Jun. 6, 2019

(51) Int. Cl.
*G06F 3/12* (2006.01)
*H04N 1/23* (2006.01)

(52) U.S. Cl.
CPC ............ *G06F 3/126* (2013.01); *H04N 1/2361* (2013.01)

(58) Field of Classification Search
CPC .............................. G06F 3/126; H04N 1/2361
See application file for complete search history.

(56) References Cited

U.S. PATENT DOCUMENTS

| | | |
|---|---|---|
| 7,209,803 B2 | 4/2007 | Okamoto et al. |
| 7,813,836 B2 | 10/2010 | Wang et al. |
| 8,761,933 B2 | 6/2014 | Oliver, III et al. |
| 9,557,740 B2 | 1/2017 | Crawley |
| 10,175,689 B2 | 1/2019 | Miyazaki et al. |
| 2013/0226344 A1 | 8/2013 | Wong et al. |
| 2014/0365060 A1 | 12/2014 | Yamamoto et al. |
| 2015/0202770 A1 | 7/2015 | Patron et al. |
| 2017/0269878 A1* | 9/2017 | Taniguchi ............ G05D 1/0212 |
| 2018/0196430 A1* | 7/2018 | Sakurai ................ G05D 1/0088 |

* cited by examiner

*Primary Examiner* — Julian D Huffman
(74) *Attorney, Agent, or Firm* — Gibb & Riley, LLC (57) ABSTRACT

Instructions to print and deliver a printed item to a destination are received by a self-navigating mobile printer that makes autonomous printing decisions. An internal controller of the mobile printer autonomously determines whether to print the printed item using an internal printer within the mobile printer or an external printer, which may print faster and at lower cost than the internal printer. A self-drive unit of the mobile printer can move the mobile printer to an external printer, based on the internal controller's determination to print the printed item using the external printer. The printed item can be automatically retrieved from an output of the external printer and fed into a storage compartment of the apparatus, using an automated retrieval feeder of the mobile printer. The mobile printer then moves to the destination using the self-drive unit under control of the internal controller to deliver the printed item.

20 Claims, 8 Drawing Sheets

SELF-NAVIGATING MOBILE PRINTERS MAKING AUTONOMOUS PRINTING DECISIONS

BACKGROUND

Systems and methods herein generally relate to self-navigating mobile printers, and more particularly to mobile printers that have the ability to make autonomous decisions.

With the advances in robotics and self-navigating devices, self-drive units have been attached to conventional printers to allow such devices to travel to locations where printing is needed. Such self-drive units commonly include powered drive wheels and/or tracks, steering mechanisms, various sensors (e.g., optical, sonic, magnetic, contact, etc.) that help the self-drive unit steer around obstacles. Additionally, conventional self-drive units include on-board maps and/or logic devices (hardware and/or software) that allows the self-drive unit to autonomously navigate known or unknown environments, which allows the self-drive unit to travel from its current position to a desired destination, with or without external assistance.

For example, with existing systems various users can submit print jobs to a server that is in communication with and directs the actions of multiple self-drive mobile printers. The print server dispatches such mobile printers to the locations of the users who submitted the print jobs to allow the mobile printer to travel to the users and output each user's print job directly to the user. This increases user satisfaction by saving the user from the inconvenience of walking to a centralized printer every time printed output is needed, allowing the users to focus their time and energies on other tasks.

However, such mobile printers have limited capabilities because of weight, size, and power concerns. Specifically, the mobile printers must be small enough to navigate narrow walkways, and such devices operate on limited battery power supplies, etc. Therefore, these mobile printers should be lightweight and therefore have limited print media storage capabilities, utilize lighter-weight and smaller components (that are potentially slower and/or produce lower quality printing), etc. Therefore, such mobile printers can have higher operating costs, slower performance, etc. Also, such mobile printers may not have the ability to print larger quantities of sheets because they often carry less printing supplies in order to remain compact and lightweight.

SUMMARY

Various apparatuses herein include (among other components) a frame, a self-drive unit connected to the frame, an internal printer connected to the frame, a retrieval feeder connected to the frame, an internal controller (operatively connected to the self-drive unit, the internal printer, and the retrieval feeder), a communications device operatively connected to the internal controller, and a storage compartment connected to the frame.

The communications device is adapted to receive instructions from a user's device or from a print server to print a printed item and deliver the printed item to a destination. The internal controller is adapted to autonomously determine whether to print the printed item using the internal printer or an external printer that is at a location different from the destination. The internal controller is adapted to control the self-drive unit to move the apparatus to the external printer if (based on) the internal controller determines that the printed item should be printed using the external printer. When needed, the retrieval feeder is adapted to automatically retrieve the printed item from an output of the external printer and feed the printed item into the storage compartment. When needed, the internal controller is adapted to control the self-drive unit to move the apparatus to the destination after the retrieval feeder has fed the printed item into the storage compartment.

In some implementations, the communications device includes a user interface. The user interface can be adapted to communicate printer choice factors to the user who supplied the instructions to print the printed item. The user interface is also adapted to receive feedback from the user in response to communicating the printer choice factors to the user. The internal controller can perform printer choice optimization based partially or fully on such feedback from the user.

Also, the internal controller can independently determine whether to print the printed item using the internal printer or the external printer by being adapted to perform an autonomous optimization based on printing costs, print job size, and travel times. In one limited example, the internal controller can be adapted to calculate the internal printing cost of printing the printed item using the internal printer and the external printing cost of printing the printed item using the external printer. Further, the internal controller can be adapted to calculate the internal printing time of printing the printed item using the internal printer and the external printing time of printing the printed item using the external printer. Also, the internal controller can be adapted to calculate the internal print travel time for the self-drive unit to move the apparatus from its present position to the destination, and to calculate the external print travel time for the self-drive unit to move the apparatus from its present position, to the external printer, and then to the destination, combined with a time for the retrieval feeder to retrieve the printed item from the output of the external printer. This allows the internal controller to be adapted to autonomously select an optimized choice of whether to print the printed item using the internal printer or the external printer based on items such as printing costs, print job size, print quality, printing supplies within the internal printer, when each printer will finish the print job, travel times, etc.

In some apparatuses herein the storage compartment has a lock that is operatively connected to the internal controller. In such apparatuses, the communications device is adapted to communicate a request to the user for security information and to receive security responses in response to the request. With such, the internal controller is adapted to open or close the lock to allow or prevent access to the storage compartment based on the security responses.

The retrieval feeder can have a belt and/or an articulated arm, etc., that are adapted to automatically retrieve the printed item from the output of the external printer and move the printed item into the storage compartment.

Also, the internal controller can be adapted to control the self-drive unit by performing an optimization route selection process when selecting routes to the external printer and the destination. The optimization route selection process is based on any of travel time, apparatus battery level, restricted route areas, print request urgency, cost, etc.

Various methods herein receive instructions to print a printed item and deliver the printed item to a destination, into a communications device of an apparatus. Such methods use the internal controller of the apparatus to automatically determine whether to print the printed item using the internal printer of the apparatus, or the external printer that is separate from the apparatus and is at a location different from the destination. For example, some methods herein can provide output from a user interface of the communications device to automatically communicate the printer choice factors to the user who supplied the instructions to print the printed item. In response, the user interface receives feedback from the user. With this, these methods can determine which printer to use based partially or fully on the feedback from the user, using the internal controller.

In other examples, methods herein use the internal controller to determine whether to print the printed item using the internal printer or the external printer by automatically performing an optimization based on printing costs, print job size, print quality, printing supplies within the internal printer, when each printer will finish the print job, travel times. In one example, these methods use the internal controller to: calculate the internal printing cost of printing the printed item using the internal printer and the external printing cost of printing the printed item using the external printer; calculate the internal printing time of printing the printed item using the internal printer and the external printing time of printing the printed item using the external printer; calculate the internal print travel time for the self-drive unit to move the apparatus from a present position of the apparatus to the destination; calculate the external print travel time for the self-drive unit to move the apparatus from the present position, to the external printer, and then to the destination, combined with a time for the retrieval feeder to retrieve the printed item from the output of the external printer. This allows these methods to use the internal controller to automatically select an optimized choice of whether to print the printed item using the internal printer or the external printer based on printing costs, print job size, print quality, printing supplies within the internal printer, when each printer will finish the print job, travel times.

These methods can print the printed item using the internal printer, and (potentially simultaneously) use a self-drive unit of the apparatus (under control of the internal controller) to move the apparatus to the destination, if and when (based on) the internal controller determines that the printed item should be printed using the internal printer.

Alternatively, these methods can use the self-drive unit of the apparatus (under control of the internal controller) to move the apparatus to the external printer, if and when (based on) the internal controller determines that the printed item should be printed using the external printer. In such a situation, the methods herein also use a retrieval feeder of the apparatus to retrieve the printed item from an output of the external printer and feed the printed item into a storage compartment of the apparatus. Such methods use the self-drive unit of the apparatus (under control of the internal controller) to move the apparatus to the destination after the retrieval feeder has fed the printed item into the storage compartment.

When controlling the self-drive unit, these methods can use the internal controller to perform an optimization route selection process when selecting from among various possible routes that will lead the apparatus to the external printer, the destination, etc. The optimization route selection process is based on travel time, apparatus battery level, restricted route areas, print request urgency, cost, etc.

Once the apparatus is at the destination with the printed item securely contained within the storage compartment, these methods may optionally only release the printed item to one with proper credentials. Therefore, these methods can communicate a request for security information using the user interface of the communications device. In response to the request, these methods receive one or more security responses using the communications device. This allows these methods to use the internal controller to control a lock of the storage compartment to open or close the lock, and thereby allow or prevent access to the storage compartment, based on the security responses.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, mobile printers can have higher operating costs, slower performance, etc., when compared to larger, fixed-position centralized printing devices and/or printing centers. However, mobile printers may not have the ability to print larger quantities of sheets or the ability to make decisions regarding the best printing options.

Therefore, with the systems and methods herein, an internal controller autonomously performs an optimization process to determine whether to print a print job using an internal printer of a mobile printing apparatus, or an external printer that is at a different location. If the controller makes the determination to print the printed item using the internal printer, the mobile printer prints and delivers the printed item. Potentially, this does not involve any travel if the mobile printer receives the instructions to print the item while at the destination where the printed item is to be delivered.

However, if the controller makes the determination to print the printed item using the external printer, a self-drive unit of the mobile printing apparatus, under control of the controller, moves the mobile printing apparatus to the external printer. The printed item can be automatically retrieved from an output of the external printer and fed into a secure storage compartment of the mobile printing apparatus, using an on-board retrieval feeder of the mobile printing apparatus. The mobile printing apparatus is moved to the destination of the user who submitted the print job after the retrieval feeder has fed the printed item into the storage compartment. The user may be required to supply proper credentials to the mobile printing apparatus in order to unlock the storage compartment and retrieve the printed item from the storage compartment.

Figure 1:
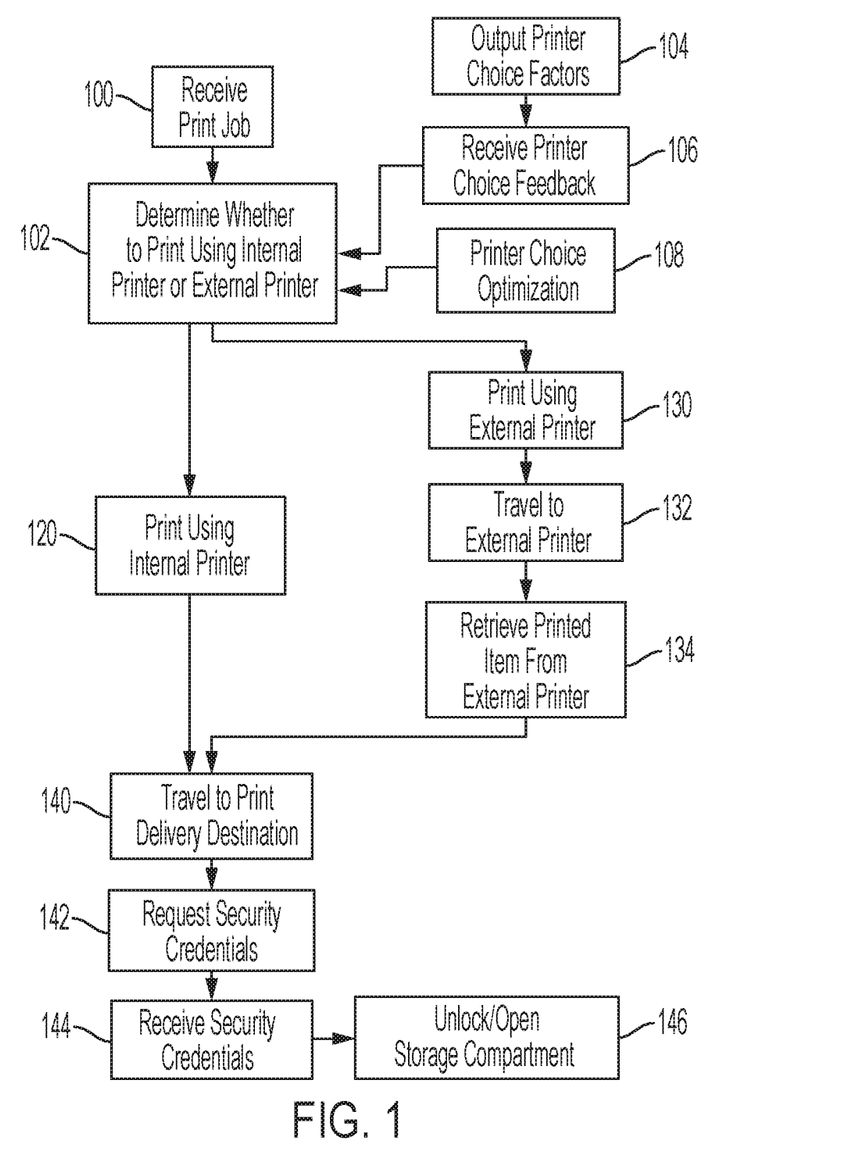
FIG. 1 is a flow diagram of various methods herein.

FIG. 1 is flowchart illustrating some aspects of exemplary methods herein. In item 100, these methods receive instructions to print a printed item and deliver the printed item to a print delivery destination (e.g., a print job) into a communications device of a mobile printing apparatus. For example, in item 100, a user who is located at what is referred to herein as a "print delivery destination" (which can be, for example, their desk, a conference room, etc.) may submit a print job to a print server through a desktop computer or portable electronic device (directly by file attachment or through cloud retrieval, etc.). Such a print job identifies the item that is to be printed and the print delivery destination where the mobile printing apparatus should deliver the printed item.

Alternatively, if the mobile printing apparatus is already positioned at the print delivery destination, in item 100, the user can directly provide the mobile printing apparatus instructions to print the print job through a communication device of the mobile printing apparatus. For example, the communication device can include many different forms of user-interfaces (microphones and voice recognition devices/systems, keyboards, touchscreens, etc.) allowing the user to provide voice commands, keyboard input, touchscreen input, etc., in item 100 to instruct the mobile printing device to print the print job. Alternatively, the print job may be sent from the user's computerized device to the communications device directly or indirectly (using wired or wireless computerized communications).

As shown in item 102, such methods use a controller, that potentially is internal to the mobile printing apparatus, or an external controller of a server to automatically determine whether to print the printed item using an internal printer of the mobile printing apparatus, or an external printer that is separate from the mobile printing apparatus and is at a location different from the print delivery destination.

As part of the processing in item 102, as shown in item 104, some methods herein can provide output, from the user interface of the communications device, printer choice factors to the user who supplied the instructions to print the printed item. In item 104, such printer choice factors can include, for example, the printing costs of printing the print job using each of the different printers, and the time it will take to complete (and deliver) the print job using the different printers; as well as other useful information such as whether the mobile printing apparatus currently has sufficient supplies on board or sufficient battery power to complete the print job, what different image quality standards the different printing devices will utilize, and/or whether the mobile printing apparatus has the capability to print the image quality level that is required by the print job, etc.

In response to communicating these printer choice factors to the user, in item 106 the user interface receives printer choice feedback from the user. Again, the printer choice feedback in item 106 can be provided verbally, through keyboard input, through touchscreen input, from the user's computerized device, etc. For example, the printer choice feedback in item 106 can merely identify the internal printer of the mobile printing apparatus or the external printer. In other examples, the printer choice feedback in item 106 can include a modification of the print job that, for example, reduces the size of the print job, reduces image quality, splits the print job between the internal printer and external printer, cancels the print job, etc. For extremely urgent print job requests where cost considerations are secondary, the systems and methods herein allow the printer choice feedback in item 106 to include an instruction to use multiple mobile printing apparatuses to complete a single print job, with each different mobile printing apparatus performing only a portion of the print job, and with all such mobile printing apparatuses delivering their respective portions of the print job to the print delivery destination (where all such mobile printing apparatuses operate simultaneously to perform the printing/delivery in parallel processing). With this, in item 102 these methods determine which printer to use based at least in part on the printer choice feedback from the user (106) using the controller.

In other examples, as shown in item 108, methods herein can use the controller to automatically determine whether to print the printed item using the internal printer or the external printer (without using user input or feedback) by automatically performing an optimization based on factors such as printing costs, print job size, print quality, printing supplies within the internal printer, when each printer will finish the print job, travel times, etc.

In one limited example of processing in item 108, these methods use the controller to: calculate an internal printing cost of printing the printed item using the internal printer and an external printing cost of printing the printed item using the external printer; calculate an internal printing time of printing the printed item using the internal printer and an external printing time of printing the printed item using the external printer; calculate an internal print travel time for the self-drive unit to move the mobile printing apparatus from its present position to the print delivery destination; calculate an external print travel time for the self-drive unit to move the mobile printing apparatus from its present position, to the external printer, and to the print delivery destination, combined with a time for the retrieval feeder to retrieve the printed item from the output of the external printer.

This allows these methods in item 108 to use the controller to select an optimized choice of whether to print the printed item using the internal printer or the external printer based on printing costs, print job size, print quality, printing supplies within the internal printer, when each printer will finish the print job, travel times. With this, in item 102 these methods determine which printer to use based on the automatically optimized printer choice (108) using the controller.

These methods can print the printed item using the internal printer in item 120, and use a self-drive unit of the mobile printing apparatus (under control of the controller) to move the mobile printing apparatus to the print delivery destination in item 140 (sequentially or simultaneously), if and when (based on) the controller determines that the printed item should be printed using the internal printer (102).

Note that items 120 and 140 can be performed simultaneously (the mobile printing apparatus can print the printed item while traveling to the print delivery destination) which increases efficiency and reduces the overall time between when the user submits the print job and when the finished printed item is provided to the user, especially when compared to systems that wait to begin printing until the mobile printing apparatus has arrived at the print delivery destination. If the mobile printing apparatus is already at the print delivery destination, the travel in item 140 is not necessary, and the mobile printing apparatus can merely remain in place and perform the printing using the internal printer 120 to output the printed item to the user.

Alternatively, if it is determined to be more advantageous to use the external printer in item 102, in item 130 these methods print the print job to produce the printed item using the external printer. Simultaneously in item 132, these methods use the self-drive unit of the mobile printing apparatus (under control of the controller) to move the mobile printing apparatus to the external printer.

Systems and methods herein can coordinate the printing of different print jobs in item 130 and the travel of various mobile printing apparatuses in item 132 based upon the various locations of various mobile printing apparatuses (including calculating the amount of time it will take each mobile printing apparatus to travel to the external printer) in order to have a corresponding printed item available for each mobile printing apparatus when it arrives at the external printer. This reduces the possibility that one or more mobile printing apparatuses will be waiting at the external printer at any given time.

In such a situation, in item 134 the methods herein also use an automated retrieval feeder of the mobile printing apparatus to automatically retrieve the printed item from an output of the external printer and feed the printed item into a storage compartment of the mobile printing apparatus. As shown in greater detail below, the retrieval feeder can have mechanical connectors that can contact the external printer to ensure that the retrieval feeder is properly positioned with respect to the output of the external printer to allow the retrieval feeder to move to the external printer into the storage compartment. For example, the retrieval feeder can have a transport belt (e.g. vacuum belt, etc.), an articulated arm, etc., that obtain the printed items from the output of the external printer and move the printed items into the storage compartment in item 134.

If and when (based on) the controller determining that the printed item should be printed using the external printer, in item 140 such methods use the self-drive unit of the mobile printing apparatus (under control of the controller) to move the mobile printing apparatus from the external printer to the print delivery destination after the retrieval feeder has fed the printed item into the storage compartment.

When controlling the self-drive unit in items 132 and 140, these methods can use the internal controller to perform an optimization route selection process. Such an optimization route selection process automatically selects from among various possible routes in order to direct the mobile printing apparatus to the external printer, the print delivery destination, etc. The optimization route selection process in items 132 and 140 is based on at least the travel time, mobile printing apparatus battery level, restricted route areas, print request urgency, cost, etc.

The mobile printing apparatus can communicate with other networked devices (e.g., servers and/or other mobile printing apparatuses) to determine if any useful pathways are blocked or crowded, or if certain doors, elevators, etc., are locked or inoperable, etc. Therefore, in items 132 and 140 multiple mobile printing apparatuses can share information in real time as each different mobile printing apparatus travels so that other mobile printing apparatuses can avoid obstacles found by different mobile printing apparatuses (such as items blocking hallways, spilled items on floors, large gatherings of individuals through which navigation is difficult, or other impediments that may slow travel) to can allow each mobile printing apparatuses to avoid routes that may take an excessively long time to traverse.

Once the mobile printing apparatus is at the print delivery destination with the printed item securely contained within the storage compartment, these methods may optionally only release the printed item to a user with proper credentials. Therefore, in item 142, these methods can output a request for security credentials/information using the user interface of the communications device (e.g., by providing voice requests, screen output, etc.).

In response to the request, in item 144 these methods receive one or more security responses (credentials/information) using the communications device (the user provides voice commands, keyboard input, touchscreen input, document scans, biometrics, etc.). For example, item 142 can request user ID, password, the scanning of an employee badge, facial recognition, other biometrics, etc., and the same can be received in item 144. This allows these methods to use the controller to control a lock or opening mechanism of the storage compartment to open or close the lock or opening mechanism in item 146, and thereby allow or prevent access to the storage compartment, based on the security responses. Therefore, once access is granted to the storage compartment in item 146, the user can retrieve the printed item without having to travel to the external printer.

Figure 2:
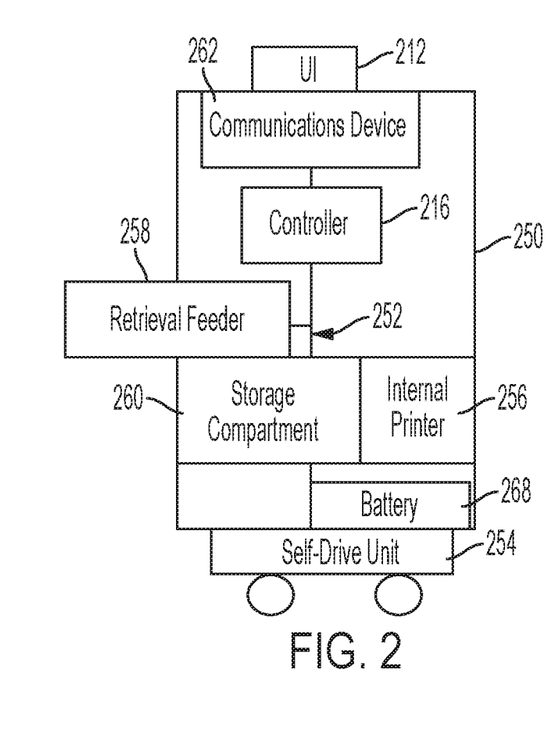
FIG. 2 is a schematic diagram illustrating a mobile printer herein.

FIG. 2 illustrates one example of a mobile printing apparatus (e.g., mobile printer 250) herein. Such apparatuses 250 include (among other components) a frame 252, a self-drive unit 254 connected to the frame 252, an internal printer 256 connected to the frame 252, a retrieval feeder 258 connected to the frame 252, an internal controller 216 (operatively connected to the self-drive unit 254, the internal printer 256, and the retrieval feeder 258), a communications device 262 (which may contain many different forms of user interface (UI) 212) operatively connected to the internal controller 216, a battery 268, and a storage compartment 260 connected to the frame 252.

As noted above, self-drive units 254 commonly include powered drive wheels and/or tracks, steering mechanisms, various sensors (e.g., optical, sonic, magnetic, contact, etc.) that help the self-drive unit steer around obstacles. Additionally, self-drive units 254 can include on-board maps and/or logic devices (hardware and/or software) that allows the self-drive unit to autonomously navigate known or unknown environments, which allows the self-drive unit to travel from its current position to a desired destination, with or without external assistance. Such items are not illustrated to avoid clutter in the drawings and to focus the reader on salient features herein.

Figure 3:
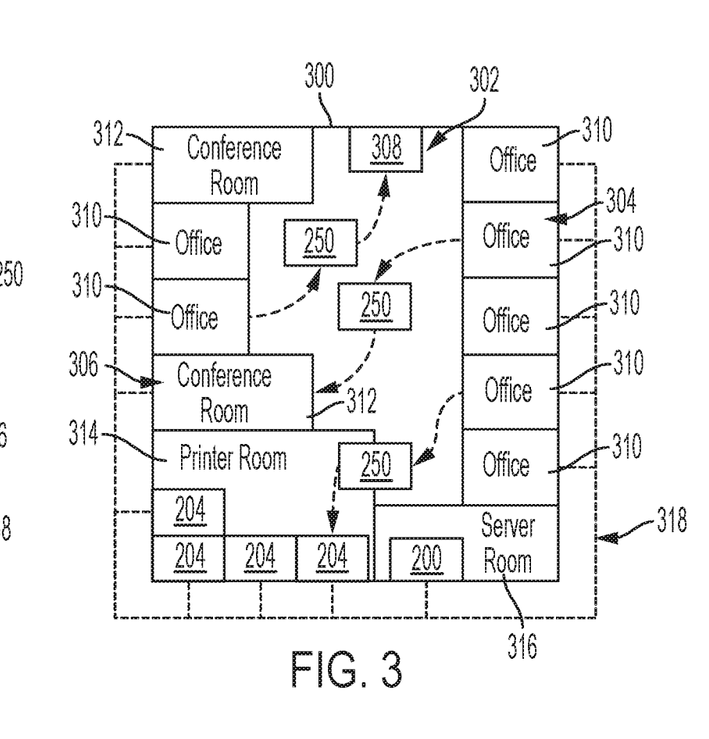
FIG. 3 is a schematic diagram illustrating mobile printers herein moving within an environment.

FIG. 3 illustrates a possible environment 300 in which the mobile printers 250 can operate. More specifically, FIG. 3 illustrates network server room 316 locations having at least one computerized network server 200, and printer room 314 locations housing non-mobile, fixed-position printing devices (external printers 204). The server(s) 200, printers 204, 250, and all other computerized devices in the offices 310 and conference rooms 316 are all in communication with each other (through their respective communication devices 262 and/or input/output devices) directly, or through a wired or wireless computerized network 318.

For example, the external printers 204 do not contain self-drive units and are only manually moved when being permanently or semi-permanently manually installed or removed. Therefore, while the mobile printers 250 autonomously move from place to place as part of their daily operations, and may be in almost constant or continuous motion except when pausing to output printed items to users, the external printers never move (or only move a few times) during their useful lifespan because of the time and cost involved in manually moving the external printers 204.

Specifically, the mobile printers 250 can autonomously navigate the hallways or corridors 302 in order to continuously travel between various locations, such as a mobile printer recharging station 308, offices 310, conference rooms 312, the printer room 314 (one of which is arbitrarily identified as a starting point 304 and another of which can be an arbitrary destination 306). Thus, FIG. 3 illustrates that the mobile printers 250 can autonomously move to or from conference room(s) 312, to or from office(s) 310, to or from external printer(s) 204, etc.

Figure 4:
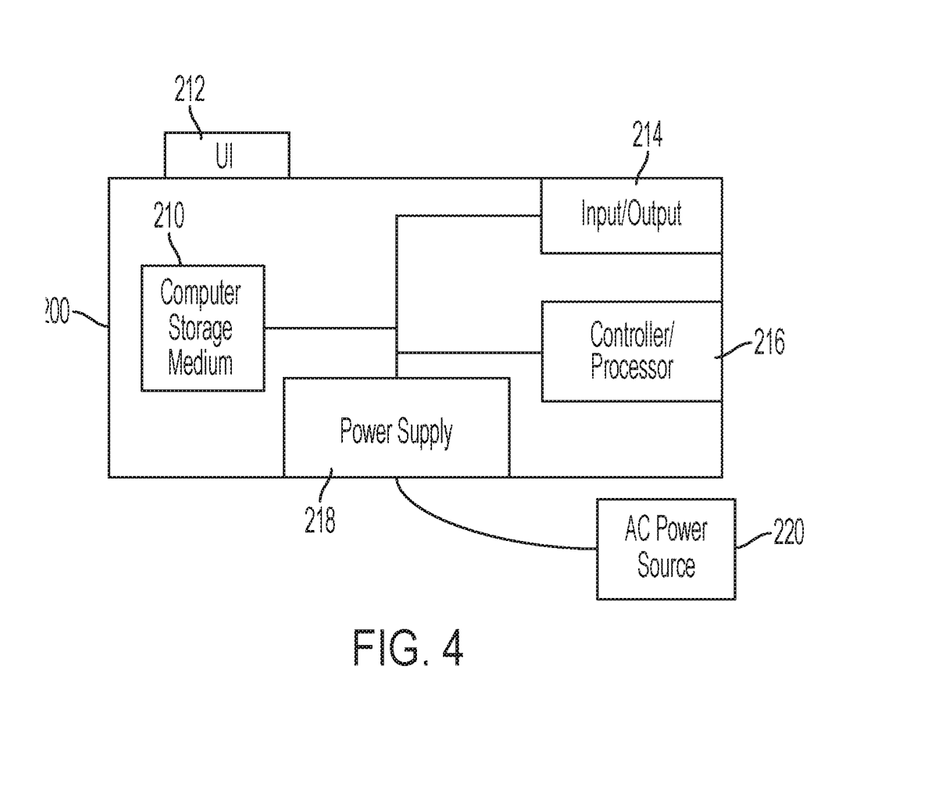
FIG. 4 is a schematic diagram illustrating computerized devices herein.

FIG. 4 illustrates a computerized device 200, which can be used with systems and methods herein and can comprise, for example, a print server, a personal computer, a portable computing device, etc. The computerized device 200 includes a controller/tangible controller 216 and a communications port (input/output) 214 operatively connected to the tangible controller 216 and to the computerized network 318 external to the computerized device 200. Also, the computerized device 200 can include at least one accessory functional component, such as a user interface (UI) assembly 212. The user may receive messages, instructions, and menu options from, and enter instructions through, the user interface or control panel 212.

The input/output device 214 is used for communications to and from the computerized device 200 and comprises a wired device or wireless device (of any form, whether currently known or developed in the future). The tangible controller 216 controls the various actions of the computerized device. A non-transitory, tangible, computer storage medium device 210 (which can be optical, magnetic, capacitor based, etc., and is different from a transitory signal) is readable by the tangible controller 216 and stores instructions that the tangible controller 216 executes to allow the computerized device to perform its various functions, such as those described herein. Thus, as shown in FIG. 4, a body housing has one or more functional components that operate on power supplied from an alternating current (AC) source 220 by the power supply 218. The power supply 218 can comprise a common power conversion unit, power storage element (e.g., a battery, etc.), etc.

Figure 5:
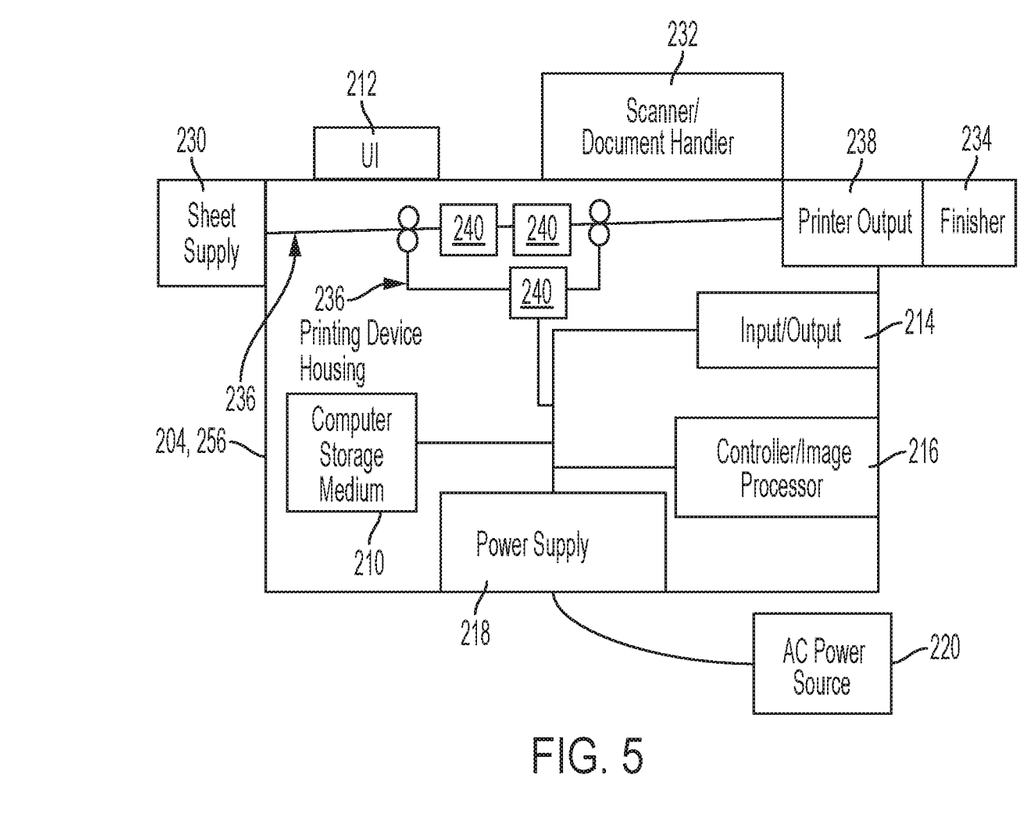
FIG. 5 is a schematic diagram illustrating printing devices herein.

FIG. 5 illustrates a computerized device that can be any of the aforementioned printing devices 204, 256, which can be used with systems and methods herein and can comprise, for example, an internal printer 256, an external printer 204, a copier, a multi-function machine, multi-function device (MFD), etc. The printing device 204, 256 includes many of the components mentioned above and at least one marking device (printing engine(s)) 240 operatively connected to a specialized image controller 216 (that may be different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can be output through a printer output 238 (e.g., output tray, sorter, etc.) optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Referring again to FIGS. 2 and 3, the communications device 262 is adapted to receive instructions to print a printed item and deliver the printed item to a destination (e.g., 306) directly by file attachment or through cloud retrieval, etc. The controller 216 is adapted to control the self-drive unit 254 to move the apparatus to the external printer 204 if (based on) the controller 216 determines to print the printed item using the external printer 204. When needed, the retrieval feeder 258 is adapted to retrieve the printed item from an output of the external printer 204 and feed the printed item into the storage compartment 260. Also, the controller 216 is adapted to control the self-drive unit 254 by performing an optimization route selection process when selecting routes to the external printer 204 and the destination. The optimization route selection process is based on any of travel time, apparatus battery level, restricted route areas, print request urgency, cost, etc.

The controller 216 is adapted to determine whether to print the printed item using the internal printer 256 or one of the external printers 204 that are at a location (e.g., print room 314) that is different from the destination 306. For example, the communications device 262 includes a user interface 212, and such a user interface 212 can be adapted to communicate printer choice factors to the user who supplied the instructions to print the printed item. In one example, the user interface 212 can be a screen or other display, and/or a speaker that provides artificial speech output, etc.

Such a user interface 212 outputs (to the user) information pertinent to the decision of where the printing should occur such as: the different printing costs of using the internal printer or the external printer; the time needed to print the printed item using the internal and external printers (which may print at different rates); the different printing qualities available with the internal and external printers; the travel times to and from the external printer; etc.

Also, the user interface 212 can output any limitations or restrictions of the internal printer (e.g., limited paper supply, toner or ink supply, printing image quality limitations, amount of battery power remaining, etc.) which may prevent the internal printer from being able to fully complete the print job. For example, the user interface 212 can output a warning to the user that the internal printer does not have enough media sheets or battery power on-board to finish the print job, or that the internal printer does not have the ability to print at the image quality or does not have the required toner/ink colors on-board that are required by the specifications of the print job, etc. Further, the communications device 262 can communicate through a common computer network with the external printers 204 to determine if the external printers 204 can fully complete the print job, and can determine how long the external printer 204 will take to print the print job, etc., and output such information about the capabilities of the external printer 204 to the user through the user interface 212.

The user interface 212 can output additional options to the user. For example, the user interface 212 can provide an option to modify the print job that, for example, reduces the size of the print job, reduces image quality, splits the print job between the internal printer 256 and an external printer 204, splits the job between multiple mobile printers 250, cancels the print job, etc. In one example, for extremely urgent print job requests where cost considerations are secondary, the user interface 212 can provide an option to use multiple mobile printing apparatuses 250 and external printers 204 in parallel to complete a single print job, with each different printing apparatus 204, 250 performing only a portion of the print job, and with all such mobile printing apparatuses 250 delivering different portions of the print job to the print delivery destination (where all such printing apparatuses operate simultaneously to perform the printing/delivery in parallel processing).

Such output from the user interface 212 allows the user to make a fully informed decision about whether to use the internal printer or the external printer. The user interface 212 is also adapted to receive feedback from the user in response to communicating the printer choice factors to the user (e.g., from keyboard input using a keyboard of the user interface 212, touch screen input using a touchscreen of the user interface 212, voice recognition using a microphone of the user interface 212, etc.). The controller 216 therefore can perform the printer choice optimization based solely, or partially, on such feedback from the user.

Alternatively, the controller 216 can fully autonomously determine whether to print the printed item using the internal printer 256 or the external printer 204 by being adapted to perform a fully automated optimization based on printing costs, print job size, print quality, printing supplies within the internal printer, when each printer will finish the print job, travel times, etc.

In one limited example, the controller 216 can be adapted to calculate an internal printing cost of printing the printed item using the internal printer 256 and an external printing cost of printing the printed item using the external printer 204. Further, the controller 216 can be adapted to calculate an internal printing time of printing the printed item using the internal printer 256 and an external printing time of printing the printed item using the external printer 204. Also, the controller 216 can be adapted to calculate an internal print travel time for the self-drive unit 254 to move the apparatus from a present position of the apparatus to the destination, and to calculate an external print travel time for the self-drive unit 254 to move the apparatus from the present position, to the external printer 204, and to the destination, combined with a time for the retrieval feeder 258 to retrieve the printed item from the output of the external printer 204. This allows the controller 216 to be adapted to select an optimized choice of whether to print the printed item using the internal printer 256 or the external printer 204 based on the internal printing cost, the external printing cost, the internal printing time, the external printing time, the internal print travel time, and the external print travel time.

In another example, the optimization logic of the internal controller 216 can have a preference for lower printing cost where there is an insignificant time difference for delivery of the printed item to the requesting user. The internal controller 216 can look to the amount of jobs in each print queue and printing speed of each of the external printers 204 to determine when the printed item would be available at the output of one of the external printers 204. The travel time for the mobile printer 250 to move to and from the external printer can also be taken into consideration. These amounts of time can be compared to the amount of time it will take the potentially slower and more expensive mobile printer to output the printed item (and travel to the destination 306, if necessary). If the less expensive printing option would result in delivery of the printed item to the destination close to the same time as the more expensive printing option, the less expensive printing option can be automatically selected by the internal controller 216.

Figure 6A:
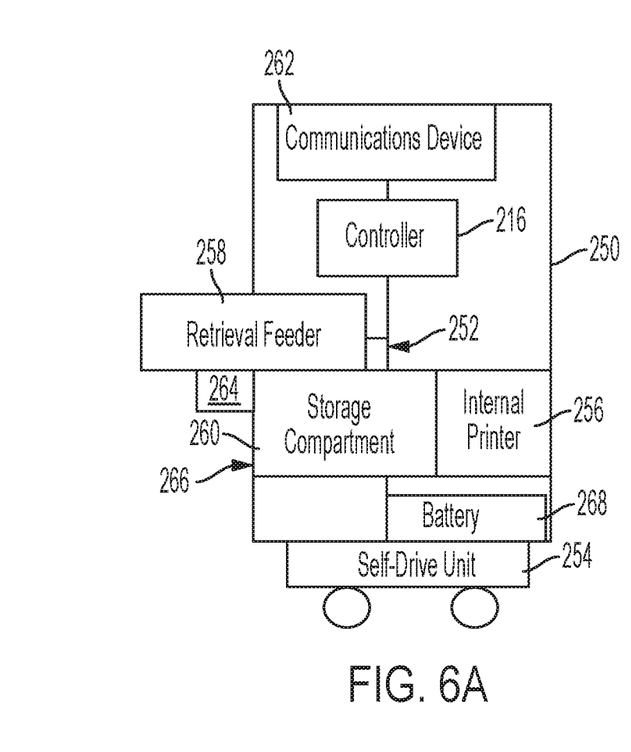
FIGS. 6A-6B are schematic diagrams illustrating a mobile printer herein.
Figure 6B:
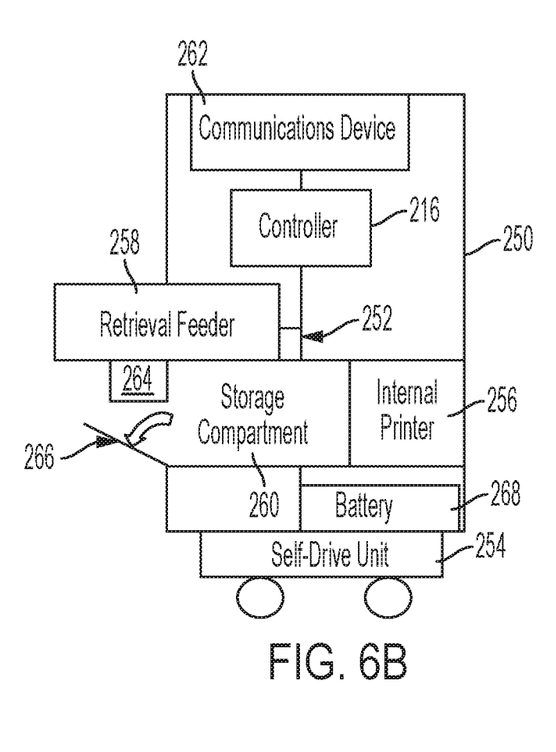

As shown in FIGS. 6A-6B, with some apparatuses herein the (secure) storage compartment 260 has an access device 266 (e.g., powered or non-powered door or tilting container) that is locked with a lock 264 that is operatively connected to the controller 216. In such apparatuses, the communications device 262 (e.g., user interface 212) is adapted to communicate a request to the user for security information and to receive security responses in response to the request. With such apparatuses, the controller 216 is adapted to open or close the access device 266 by locking or unlocking the lock 264 to allow or prevent access to the storage compartment 260 based on the security responses.

Thus, once the mobile printing apparatus 250 is at the destination 306 with the printed item securely contained within the storage compartment 260, these mobile printing apparatuses 250 may optionally only release the printed item to one with proper credentials. Therefore, the communications device 262 can output to the user a request for security credentials/information using the user interface 212 (e.g., by providing voice requests, screen output, etc.). In response to the request, the mobile printing apparatus 250 receives one or more security responses (credentials/information) from the user using the communications device. For example, the user may provide (alone, or any combination of) voice commands to a microphone of the user interface 212, keyboard input to a keyboard of the user interface 212, touchscreen input to a touchscreen of the user interface 212, scanned document input to a scanner of the user interface 212, biometric information (speech, fingerprint, facial recognition, etc.) to a biometric input device (reader) of the user interface 212 etc.

Thus, the user interface 212 can request a user ID, password, the scanning of an employee badge, facial recognition, etc., and the same can be received using the user interface 212. This allows these methods to use the internal controller 216 to control the lock 264 or other opening mechanism of the storage compartment 260 to open or close the storage compartment 260, and thereby allow or prevent access to the storage compartment 260, based on the security responses provided to the user interface 212. Once access is granted to the storage compartment 260, the user can retrieve the printed item without having to traveled to the external printer 204, increasing ease of use.

Figure 7:
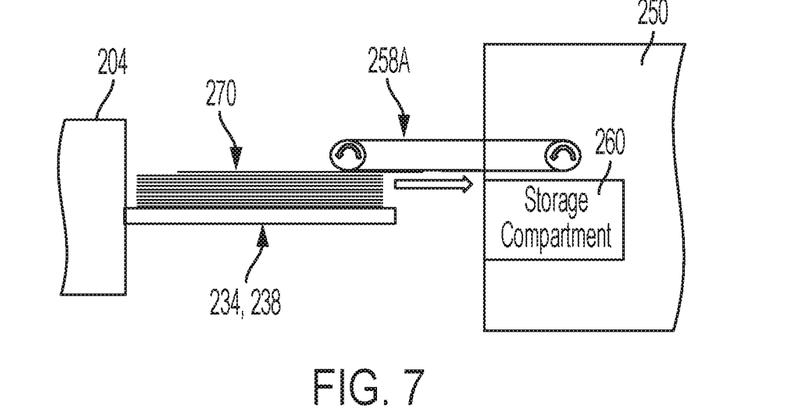
FIGS. 7-9 are schematic diagrams illustrating retrieval feeders of mobile printers herein.
Figure 8:
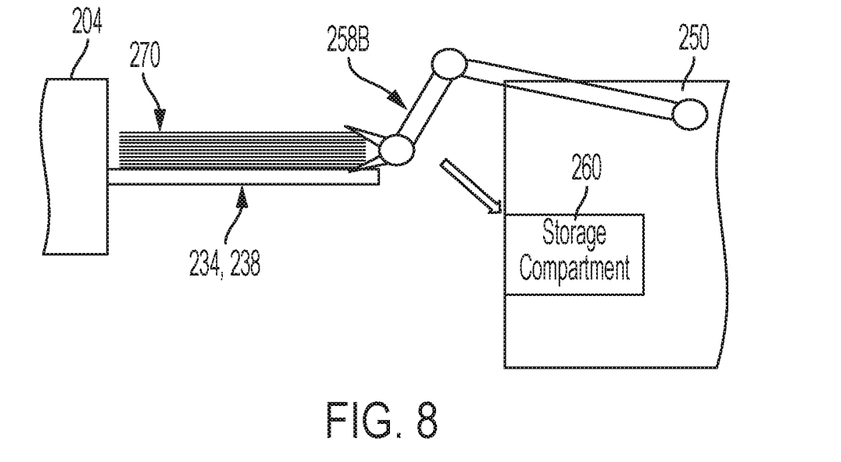

The retrieval feeder 258 can be any structure that has the ability to move printed items from the output of the printer 238 or the output of any finisher 234 to the storage compartment 260. FIG. 7 illustrates one example of the retrieval feeder 258A that is a belt device (e.g., vacuum belt, friction belt, electrostatic belt, air feeder, vacuum feeder, etc.) that has the ability to move individual printed sheets or stacks of printed sheets (270) from any output element 234, 238 into the storage compartment 260. FIG. 8 illustrates another example of the retrieval feeder 258B that is an articulated arm (e.g., robotic arm, etc.) with a grasping mechanism that also has the ability to grab and move individual printed sheets or stacks of printed sheets (270) from any output element 234, 238 into the storage compartment 260.

While the foregoing examples illustrate that the retrieval feeder 258 can be a belt 258A or an articulated arm 258B, the retrieval feeder 258 is not limited to these structures, and instead the retrieval feeder 258 can be any other similar structure that has the ability to move individual sheets or groups of sheets 270 from an output 234, 238 to the storage compartment 260.

Figure 9:
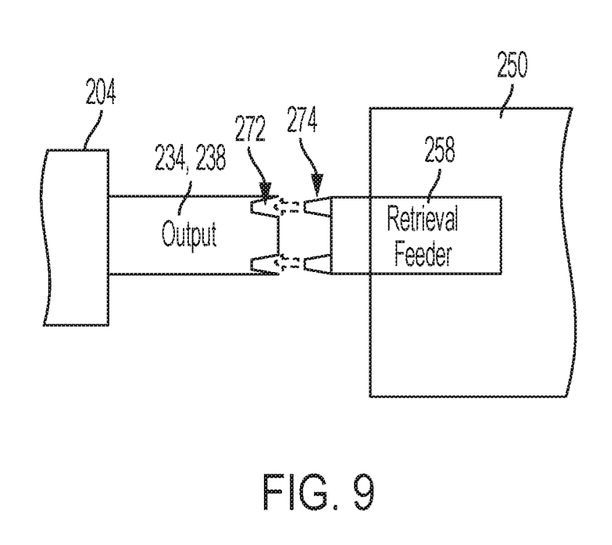

Additionally, FIG. 9 illustrates that all forms of the retrieval feeder 258 can include mechanical connectors 274 that are shaped and positioned to connect to corresponding mechanical connectors 272 of any output 234, 238. For example, the corresponding connectors 272, 274 can be projections that connect to matching recesses, clamps that engage with or corresponding locks to receivers, electromagnetic connections that electromagnetically connect to corresponding metallic plates, etc.

Figure 10:
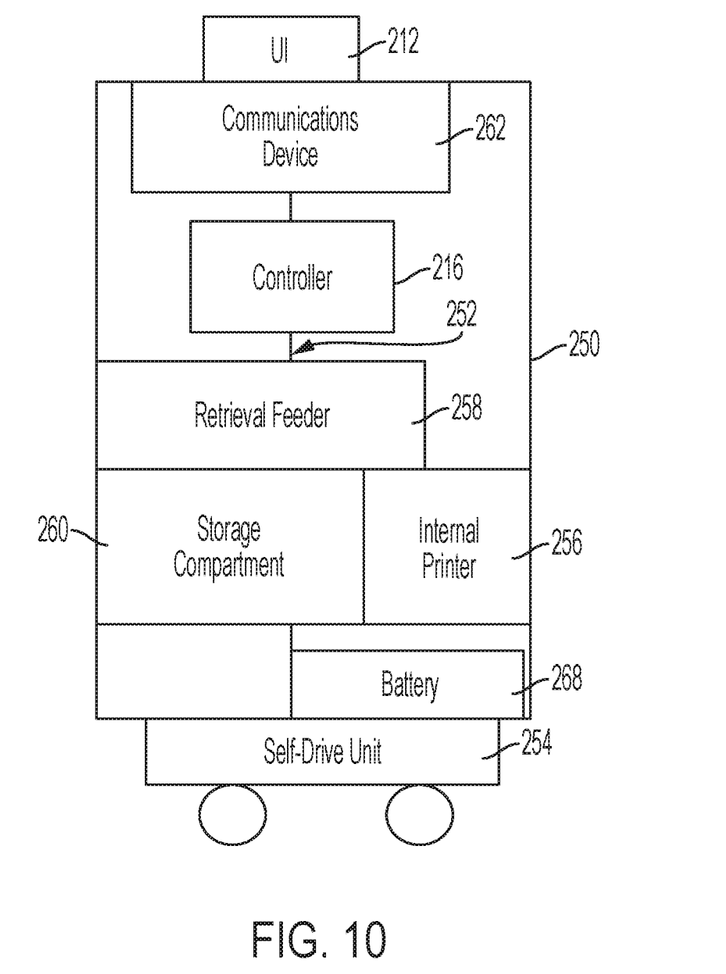
FIG. 10 is a schematic diagram illustrating a mobile printer herein.

As shown in FIG. 10, any such retrieval feeders 258 can be retractable or foldable into the interior of the mobile printer 250 for compactness and appearance, and the retrieval feeders 258 may only extend beyond the exterior body of the mobile printer 250 when retrieving a printed item 270 from an output 234, 238 of an external printer 204.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
    a frame;
    a self-drive unit connected to the frame;
    an internal printer connected to the frame;
    a controller operatively connected to the self-drive unit and the internal printer;
    a communications device operatively connected to the controller; and
    a storage compartment connected to the frame,
    wherein the communications device is adapted to receive instructions to print a printed item and deliver the printed item to a destination,
    wherein the controller is adapted to determine whether to print the printed item using the internal printer or an external printer that is at a location different from the destination,
    wherein the controller is adapted to control the self-drive unit to move the apparatus to the external printer based on the controller determining to print the printed item using the external printer, and
    wherein the controller is adapted to control the self-drive unit to move the apparatus to the destination after the printed item has been fed into the storage compartment.

2. The apparatus according to claim 1, wherein the communications device includes a user interface that is adapted to:
    communicate printer choice factors to a user supplying the instructions to print the printed item; and
    receive feedback from the user in response to communicating the printer choice factors, and
    wherein the controller determines whether to print the printed item using the internal printer or an external printer based on the feedback from the user.

3. The apparatus according to claim 1, wherein the controller determines whether to print the printed item using the internal printer or the external printer by being adapted to perform an optimization based on printing costs, print job size, and travel times.

4. The apparatus according to claim 3, wherein the controller performs the optimization by being adapted to:
    calculate an internal printing cost of printing the printed item using the internal printer and an external printing cost of printing the printed item using the external printer;
    calculate an internal printing time of printing the printed item using the internal printer and an external printing time of printing the printed item using the external printer;
    calculate an internal print travel time for the self-drive unit to move the apparatus from a present position of the apparatus to the destination;
    calculate an external print travel time for the self-drive unit to move the apparatus from the present position, to the external printer, and to the destination; and select an optimized choice of whether to print the printed item using the internal printer or the external printer based on the internal printing cost, the external printing cost, the internal printing time, the external printing time, the internal print travel time, and the external print travel time.

5. The apparatus according to claim 1, wherein the storage compartment comprises a lock operatively connected to the controller,
wherein the communications device is adapted to communicate a request for security information and to receive security responses in response to the request, and
wherein the controller is adapted to open or close the lock to allow or prevent access to the storage compartment based on the security responses.

6. The apparatus according to claim 1, further comprising a retrieval feeder adapted to retrieve the printed item from an output of the external printer and feed the printed item into the storage compartment, wherein the retrieval feeder comprises at least one of a belt and an articulated arm that is adapted to retrieve the printed item from the output of the external printer and move the printed item into the storage compartment.

7. The apparatus according to claim 1, wherein the controller is adapted to control the self-drive unit by performing an optimization route selection process when selecting routes to the external printer and the destination, wherein the optimization route selection process is based on at least one of travel time, apparatus battery level, restricted route areas, print request urgency, and cost.

8. An apparatus comprising:
a frame;
a self-drive unit connected to the frame;
an internal printer connected to the frame;
a retrieval feeder connected to the frame;
a controller operatively connected to the self-drive unit, the internal printer, and the retrieval feeder;
a communications device operatively connected to the controller; and
a storage compartment connected to the frame,
wherein the communications device is adapted to receive instructions to print a printed item and deliver the printed item to a destination,
wherein the controller is adapted to determine whether to print the printed item using the internal printer or an external printer that is at a location different from the destination,
wherein the controller is adapted to control the self-drive unit to move the apparatus to the external printer based on the controller determining to print the printed item using the external printer,
wherein the retrieval feeder is adapted to retrieve the printed item from an output of the external printer and feed the printed item into the storage compartment, and
wherein the controller is adapted to control the self-drive unit to move the apparatus to the destination after the retrieval feeder has fed the printed item into the storage compartment.

9. The apparatus according to claim 8, wherein the communications device includes a user interface that is adapted to:
communicate printer choice factors to a user supplying the instructions to print the printed item; and
receive feedback from the user in response to communicating the printer choice factors, and
wherein the controller determines whether to print the printed item using the internal printer or an external printer based on the feedback from the user.

10. The apparatus according to claim 8, wherein the controller determines whether to print the printed item using the internal printer or the external printer by being adapted to perform an optimization based on printing costs, print job size, and travel times.

11. The apparatus according to claim 10, wherein the controller performs the optimization by being adapted to:
calculate an internal printing cost of printing the printed item using the internal printer and an external printing cost of printing the printed item using the external printer;
calculate an internal printing time of printing the printed item using the internal printer and an external printing time of printing the printed item using the external printer;
calculate an internal print travel time for the self-drive unit to move the apparatus from a present position of the apparatus to the destination;
calculate an external print travel time for the self-drive unit to move the apparatus from the present position, to the external printer, and to the destination, combined with a time for the retrieval feeder to retrieve the printed item from the output of the external printer; and
select an optimized choice of whether to print the printed item using the internal printer or the external printer based on the internal printing cost, the external printing cost, the internal printing time, the external printing time, the internal print travel time, and the external print travel time.

12. The apparatus according to claim 8, wherein the storage compartment comprises a lock operatively connected to the controller,
wherein the communications device is adapted to communicate a request for security information and to receive security responses in response to the request, and
wherein the controller is adapted to open or close the lock to allow or prevent access to the storage compartment based on the security responses.

13. The apparatus according to claim 8, wherein the retrieval feeder comprises at least one of a belt and an articulated arm that is adapted to retrieve the printed item from the output of the external printer and move the printed item into the storage compartment.

14. The apparatus according to claim 8, wherein the controller is adapted to control the self-drive unit by performing an optimization route selection process when selecting routes to the external printer and the destination, wherein the optimization route selection process is based on at least one of travel time, apparatus battery level, restricted route areas, print request urgency, and cost.

15. A method comprising:
receiving instructions, to print a printed item and deliver the printed item to a destination, into a communications device of an apparatus;
determining whether to print the printed item using an internal printer of the apparatus or an external printer, that is at a location different from the destination, using a controller of the apparatus;
moving the apparatus to the external printer, based on the controller determining to print the printed item using the external printer, using a self-drive unit of the apparatus under control of the controller;

retrieving the printed item from an output of the external printer and feeding the printed item into a storage compartment of the apparatus, using a retrieval feeder of the apparatus; and moving the apparatus to the destination after the retrieval feeder has fed the printed item into the storage compartment, using the self-drive unit of the apparatus under control of the controller.

16. The method according to claim 15, further comprising:

communicating printer choice factors to a user supplying the instructions to print the printed item, using a user interface of the communications device;

receiving feedback from the user in response to communicating the printer choice factors, using the user interface; and determining whether to print the printed item using the internal printer or an external printer based on the feedback from the user, using the controller.

17. The method according to claim 15, further comprising determining whether to print the printed item using the internal printer or the external printer by performing an optimization based on printing costs, print job size, and travel times, using the controller.

18. The method according to claim 17, wherein the optimization comprises:

calculating an internal printing cost of printing the printed item using the internal printer and an external printing cost of printing the printed item using the external printer;

calculating an internal printing time of printing the printed item using the internal printer and an external printing time of printing the printed item using the external printer;

calculating an internal print travel time for the self-drive unit to move the apparatus from a present position of the apparatus to the destination;

calculating an external print travel time for the self-drive unit to move the apparatus from the present position, to the external printer, and to the destination, combined with a time for the retrieval feeder to retrieve the printed item from the output of the external printer; and selecting an optimized choice of whether to print the printed item using the internal printer or the external printer based on the internal printing cost, the external printing cost, the internal printing time, the external printing time, the internal print travel time, and the external print travel time.

19. The method according to claim 15, further comprising:

communicating a request for security information using the communications device;

receiving security responses in response to the request using the communications device; and controlling a lock of the storage compartment to open or close the lock to allow or prevent access to the storage compartment based on the security responses, using the controller.

20. The method according to claim 15, further comprising controlling the self-drive unit by performing an optimization route selection process when selecting routes to the external printer and the destination, using the controller, wherein the optimization route selection process is based on at least one of travel time, apparatus battery level, restricted route areas, print request urgency, and cost.

* * * * *